United States Patent [19]
Jonsson

[11] Patent Number: 5,217,508
[45] Date of Patent: Jun. 8, 1993

[54] WASTE GAS TREATMENT METHOD AND SYSTEM

[76] Inventor: Kjarten A. Jonsson, Sage Road, Ballston Lake, N.Y. 12019

[21] Appl. No.: 810,491

[22] Filed: Dec. 19, 1991

[51] Int. Cl.⁵ .......................................... B01D 47/00
[52] U.S. Cl. ........................................ 55/89; 55/222; 55/228; 55/257.2
[58] Field of Search ............... 55/85, 89.22, 222, 228, 55/257.2; 261/117, 127; 110/215

[56] References Cited

U.S. PATENT DOCUMENTS

| | | | |
|---|---|---|---|
| 596,996 | 1/1898 | Griffiths | 261/117 |
| 2,583,252 | 1/1952 | Carraway | 55/228 |
| 3,487,607 | 1/1970 | Cox | 55/222 |
| 4,251,236 | 2/1981 | Fattinger et al. | 55/84 |

FOREIGN PATENT DOCUMENTS

| | | | |
|---|---|---|---|
| 28565 | 12/1924 | France | 55/220 |
| 124520 | 9/1980 | Japan | 55/228 |
| 84130 | 5/1985 | Japan | 55/228 |
| 796458 | 1/1981 | U.S.S.R. | 55/228 |

Primary Examiner—Bernard Nozick
Attorney, Agent, or Firm—Schmeiser, Morelle & Watts

[57] ABSTRACT

A waste hot gas stream is cleaned by a method and an apparatus implementing the method by traveling the stream through a heat exchange station in indirect heat exchange contact with the heat exchange fluid, and traveling the cooled stream through a liquid spray, filtering the spray liquid and recirculating it, demisting the gas stream and traveling it through a gas stream cleaning station in contact with continuously flowing fresh water before discharging the clean gas stream to the atmosphere.

7 Claims, 4 Drawing Sheets

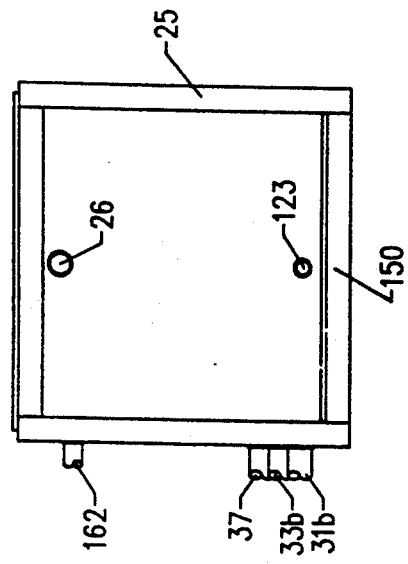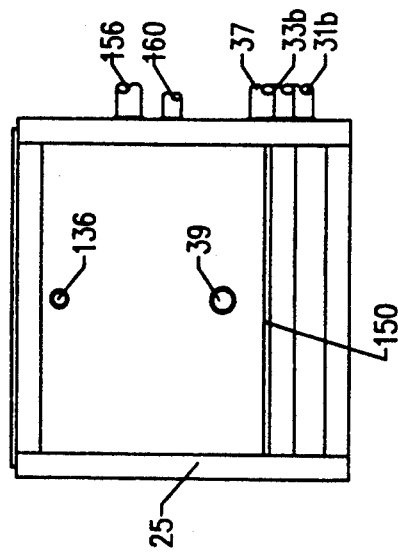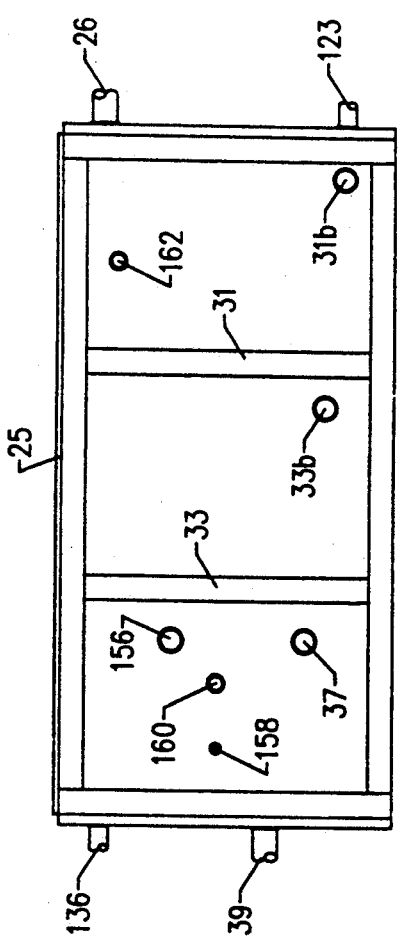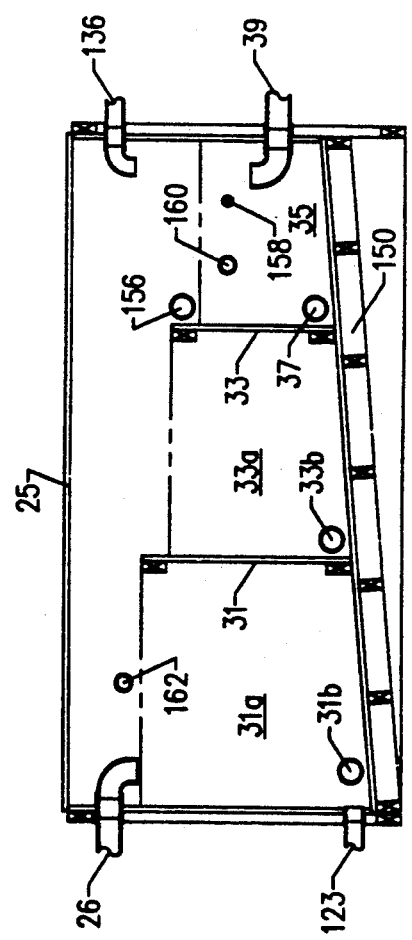

5,217,508

WASTE GAS TREATMENT METHOD AND SYSTEM

FIELD OF THE INVENTION

The present invention relates generally to the art of cleaning flowing gases, and is more particularly concerned with a new method for separating and removing particulate material, moisture and oxides of nitrogen and sulpher from fossil fuel combustion gases and industrial effluent gases in general, and with a novel system implementing that method.

CROSS REFERENCE

This invention is related to that of my U.S. patent application Ser. No. 545,383, filed Jun. 28, 1990 (now U.S. Pat. No. 5,076,818) and entitled. GAS CLEANING METHODS AND APPARATUS in which a novel rotating wheel array is disclosed and claimed along with a new gas purification method involving the use of that unique apparatus. Auxiliary gas treatment equipment is also disclosed and claimed therein. The total disclosure in that case as incorporated herein by reference.

BACKGROUND OF THE INVENTION

Increasing public environmental awareness and concern about the consequences of atmospheric pollution has stimulated determined efforts to find an effective and economical way to rid effluent gases to industrial operations and electric power generating plants of their contaminant burdens. A large number and variety of systems, devices and methods have been proposed in response to this demand and some have been widely used. The apparatus claimed in the above-identified patent application, however, stands out as clearly the most effective and efficient means for this purpose. It also holds an economic advantage over prior art devices, initial cost comparing favorably with that of alternative apparatus in general use and operating and maintenance total cost being relatively very low.

SUMMARY OF THE INVENTION

By virtue of the present invention, based upon the new concepts set forth below, substantial improvement can be made in cleaning and ridding waste gases of solid, gaseous and liquid burdens so that almost totally clean air is ultimately discharged from an industrial plant or a power generating facility. Moreover, this important new result is obtainable in accordance with this invention without significant economic penalty or reduction of power generation or plant production capacity, and regardless of the constituency of such gases.

The invention additionally affords an important energy recovery opportunity and enables manual or automatic pH control of gas discharges to the atmosphere.

According to one of my new concepts, heat is extracted from hot waste gas and recovered while treating the gas for discharge to the atmosphere in compliance with environmental laws and regulations.

Another novel concept of mine is to use a liquid spray to separate and remove contaminants, and to recirculate and reuse the liquid as waste gas treatment spray after filtering and adjusting its pH.

In accordance with another new concept of this invention, gas precooler apparatus is provided in a gas discharge system including gas separating apparatus, the precooler being upstream of the treating apparatus and operating in indirect heat exchange mode using a suitable fluid such as air or water flowing in contact with the gas flue and recirculated after stripping of its heat for useful purposes.

The novel method and system of this invention have special utility in combination with the gas cleaning apparatus disclosed and claimed in my aforesaid patent application Ser. No. 545,383, but are also useful to substantial advantage in certain circumstances with or without a gas cleaner of any kind. Thus, I have found that desired improvement in quality of waste gas satisfying some purposes or regulations can be consistently obtained by first cooling them and then separating them, and finally demisting them.

Described in general terms, the novel system of this invention comprises a segmented flue including a gas precooler apparatus, a gas separating apparatus downstream from the precooler apparatus, the gas separating apparatus comprising a cylindrical vessel and spray header means and mist eliminator means in the vessel downstream from the spray header means. In a preferred embodiment, this novel system includes gas cleaning apparatus downstream from the cylindrical vessel.

Likewise broadly described, the method of this invention comprises the steps of traveling a hot waste gas stream through a heat exchange station, flowing heat exchange fluid in indirect heat exchange contact with the stream, and recovering heat from the flowing heat exchange fluid. It also includes the steps of traveling the resulting cooled waste gas stream through a liquid spray, collecting and filtering the spray liquid and recirculating it in repetition of the spray cycle, traveling the cooled and spray-cleaned waste gas stream through a demisting station, and finally discharging the cooled and treated and demisted waste gas stream to the atmosphere.

BRIEF DESCRIPTION OF THE DRAWINGS

Those skilled in the art will gain a further and better understanding of the present invention from the following detailed description of this invention taken together with the drawings accompanying and forming a part of this specification, in which:

FIG. 3 is a side elevational view of the settling tank of the system of FIG. 1;

FIG. 4 is an elevational view of the discharge end of the settling tank of FIG. 3;

FIG. 5 is a view like that of FIG. 3 of the settling tank with the side wall removed to show the cascade dams and to indicate the waterflow course through the tank;

FIG. 6 is an elevational view of the charging end of the settling tank of FIG. 3;

DETAILED DESCRIPTION OF THE INVENTION

Figure 1:
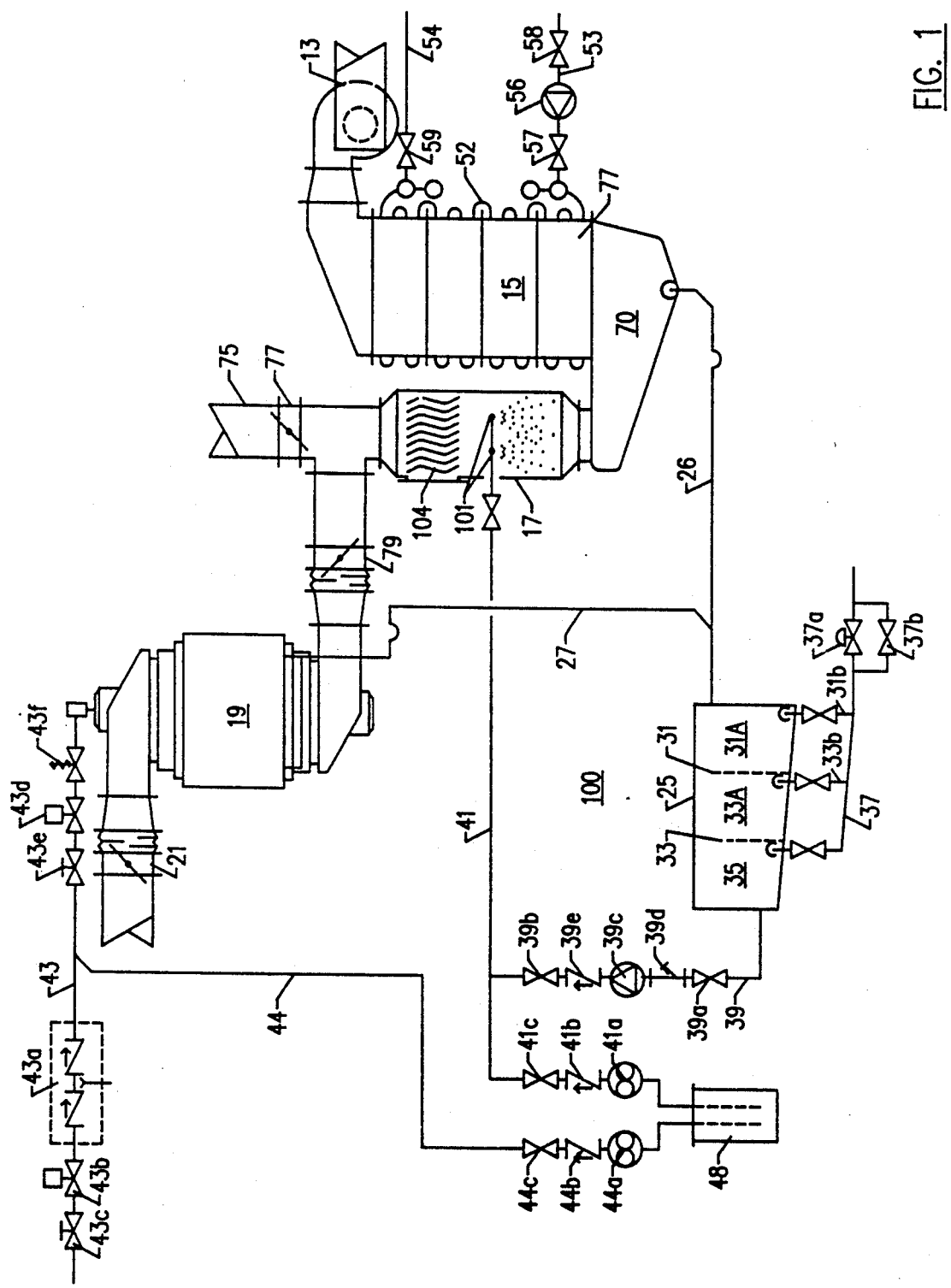
FIG. 1 is a schematic view of a waste gas treatment system of this invention including a gas precooler apparatus, a gas separating apparatus with mist elimination means, and a gas cleaning apparatus.

In FIG. 1 a gas treatment system 10 of this invention is shown assembled for use in treating stack gases, being positioned to receive hot waste gas from a stack (not shown) and serving as a flue to convey the gas through cooling, treating, demisting and cleaning stages. Additionally, system 10 includes spray water recirculation means 11 to receive spray water, separate solids from it and return the water to spraying use in the treating and cleaning stages of the operation.

System 10 is a segmented flue comprising a gas intake port segment 13 to receive hot waste gas from a stack (not shown) and deliver that gas into gas precooling apparatus segment 15. Gas separating apparatus segment 7 is immediately downstream from the precooler segment connected to gas cleaning segment 19 to deliver cooled and treated gas for cleaning and discharge from the system to the atmosphere through gas exhaust port segment 21.

Spray water recirculation means 11 comprises a settling tank 25 and drain lines 26 and 27 serving separating apparatus 17 and cleaning apparatus 19 to deliver accumulating spray water continuously into tank 25. Cascade dams 31 and 33 divide tank 25 into chambers 31A, 33A and 35 of diminishing depth in the direction of water flow, and sludge drains 31B, 33B and 37 serve the respective three chambers for removal and discharge to waste of accumulated sludge at regular intervals or as necessary. Solenoid valve 37a and manual valve 37b afford alternative control of sludge discharge from the system. Substantially solids-free spray liquid is withdrawn continuously from tank 25 through line 39 and pumped continuously into line 41 serving separating apparatus 17. Shut off valves 39a and 39b in line 39 on opposite sides of pump 39c provide for control of flow of spray liquid to line 41. A strainer 39d between valve 39a and pump 39c removes any solid entrained in the flowing spray water and check valve 39e beweem pump 39c and shut off valve 39b prevents back flow through line 39.

Fresh water is delivered into cleaning apparatus 19 through line 43 and alkali solution is introduced into the fresh water flow by line 44 at a point downstream from back flow preventer assembly 43a and solenoid valve 43b and manual shut off valve 43c. Between line 44 and separator apparatus 19, pressure is regulated by a flow controller 43d which stands between shut off valves 43e and 43f.

A supply of aqueous alkali, suitably caustic soda solution provided in vessel 48 is manually or automatically metered into lines 41 and 44 as necessary to maintain the fresh water and the recirculating spray liquid pH at a predetermined desired level. The alkali solution is delivered into lines 41 and 44 and controlled in flow by means of pump and valve means in each instance. This pump 41a draws alkali solution from a supply source and moves it through check valve 41b and shut off valve 41c and shut off valve 41d adjacent to separating apparatus 17. Similarly, alkali solution is flowed through line 44 under the action of pump 48a, passing through check valve 48b and shut off valve 48c.

Precooler apparatus segment 15 comprises a generally cylindrical shell 50 having inlet and outlet ports at its ends to receive and discharge waste gas flowing in through flue segment 13 and out to separating apparatus 17. Additionally, shell 50 is fitted with a cooling fluid coil 52 through which fluid is flowed continuously during operation of system 10. Lines 53 and 54 serving coil 52 are suitably connected to a heat recovery facility (not shown) and pump 56 together with valves 57 and 58 in line 53, and valve 59 in line 54 maintain and regulate flow for desired cooling effect.

Figure 2:
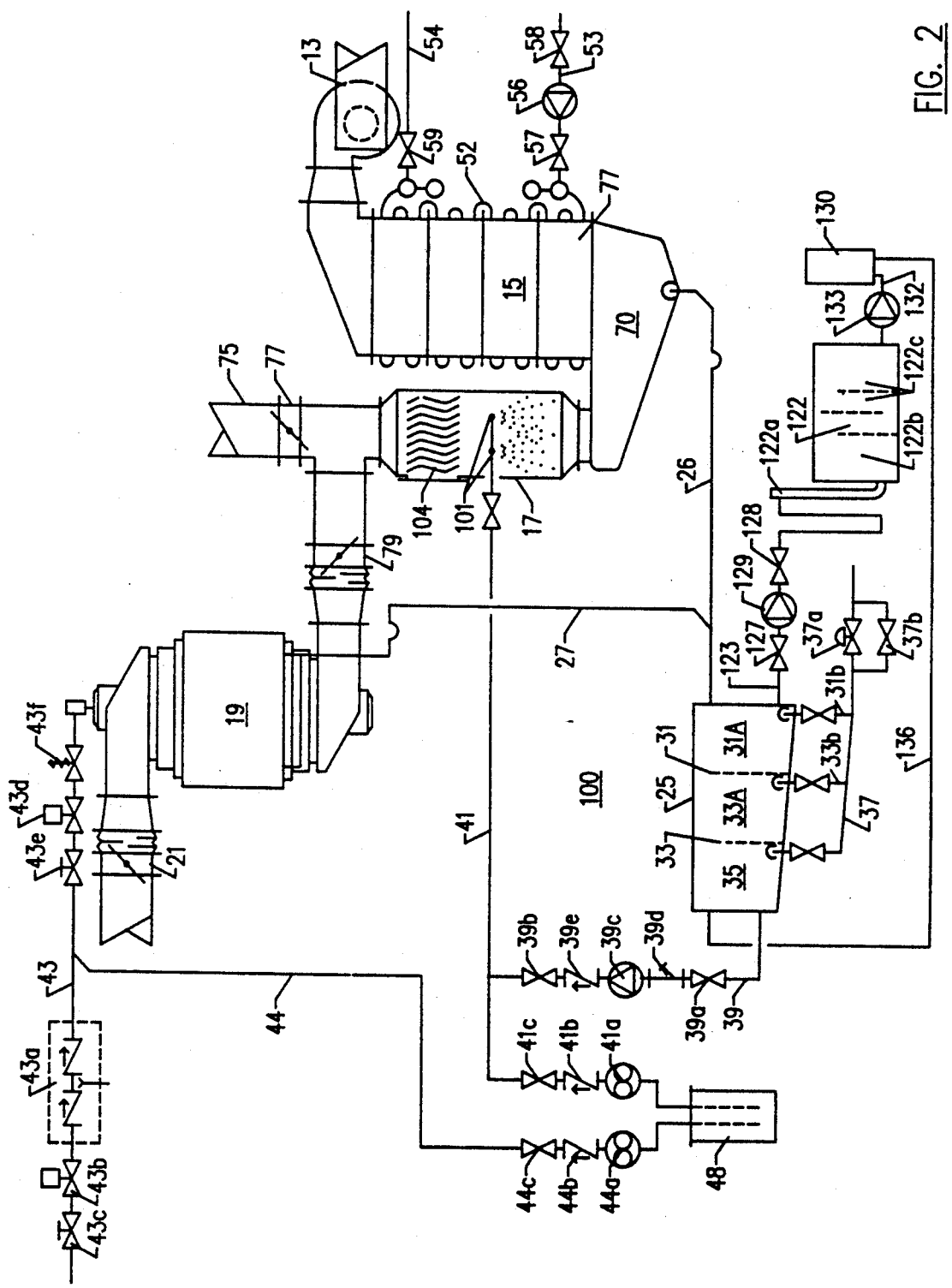
FIG. 2 is a view like that of FIG. 1 of the presently preferred waste gas treatment system of this invention including in addition to the FIG. 1 system, a continuous filter fixture.
Figure 9:
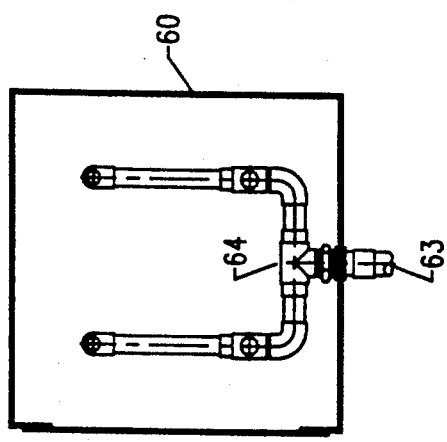
Figure 8:
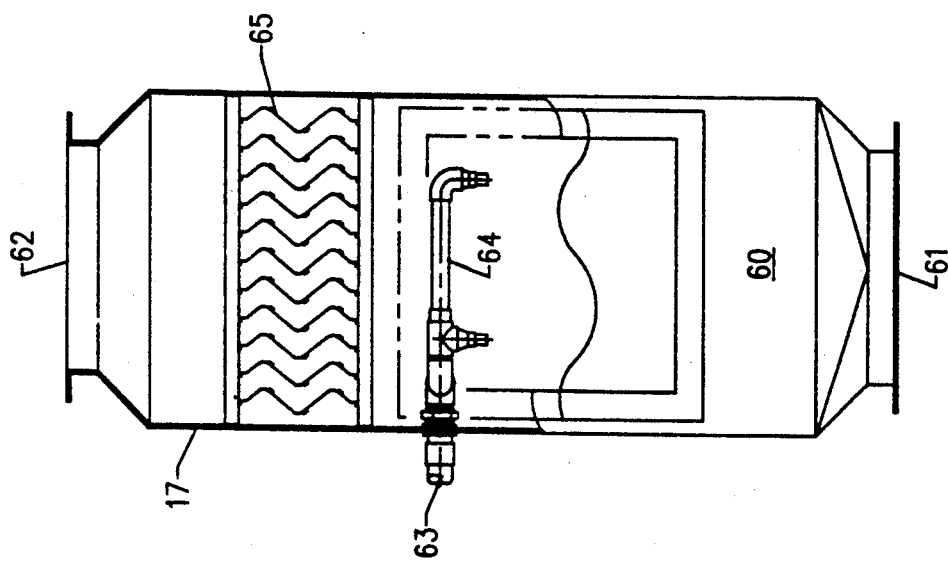
FIG. 8 is a view of the gas separator apparatus taken at 90 degrees from that of FIG. 6, parts again being removed for purposes of illustration; and, FIG. 9 is a sectional view taken on line 9—9 of FIG. 7 showing the spray header means on operating position in the gas separator apparatus.
Figure 7:
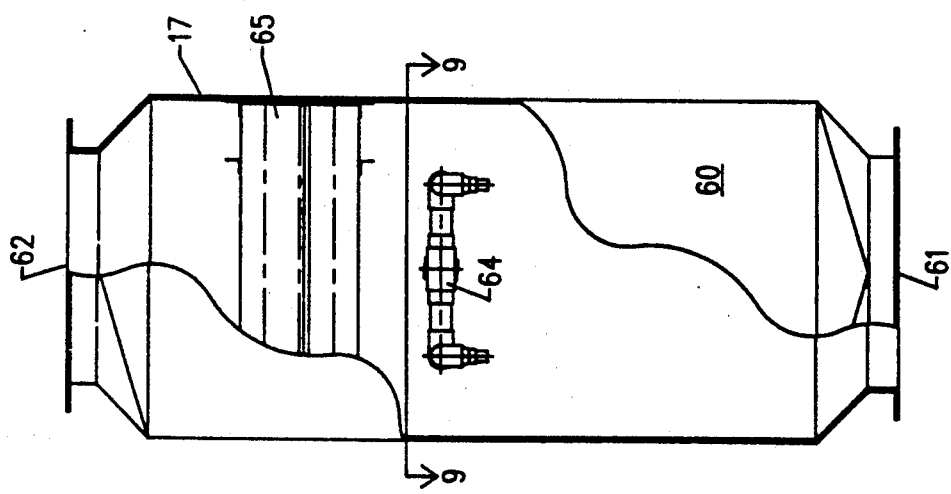
FIG. 7 is an elevational view of the gas separator apparatus of the system of FIG. 1, parts being broken away for clarity.

As shown to best advantage in FIGS. 7 and 8, gas separating apparatus 17 comprises a cylinder 60 having an inlet port 61 at its lower end and an outlet port 62 at the top for discharge of cooled and treated waste gas into gas cleaner 19. In the midsection of cylinder 60, a port is provided for delivery through line 63 of fresh or recirculated spray water to spray header 64. Demister 65, suitably of conventional design is mounted in cylinder 60 above header 64 and serves the purpose of removing gas-borne moisture burden of treated gas rising toward the exhaust port at the top of cylinder 60. Demister 65 is not shown in FIG. 1 but is shown in FIG. 2 and described below in detail as to structure and function in the section of the specification directed to that embodiment of the invention.

Precooler apparatus 15 and separating apparatus 17 are connected by sump vessel 70 which serves the double purpose of providing communication for the gas flow between the precooler and the separator and accumulating spray water draining from separator 17 for delivery through line 26 settling tank 25.

Gas cleaning apparatus 19 is preferably that disclosed and claimed in the aforesaid copending patent application Ser. No. 543,383. It will be understood, however, that other gas cleaning apparatus may be used such as that of the prior art described in the background statement set out in that 383 patent application.

As an additional special feature of system 10, a secondary gas exhaust port segment 75 is provided in the flue section just above the exit port of the treating separating apparatus 17. Segment 75 is open to the atmosphere so that gas exiting the cylinder 60 and requiring no further treatment for cleaning in compliance with applicable regulations can be discharged directly into the atmosphere. A valve 77 serves to open and close segment 75 and a valve 79 in the flue segment connecting treating apparatus 17 and cleaning apparatus 19 can be opened and closed as desired to direct flow of gas from cylinder 60 of separating apparatus 17 either directly to the atmosphere through segment 75 or to cleaning apparatus 19.

In system 100 shown in FIG. 2, parts corresponding to those in FIG. 1 bear the same reference characters and in operation serve the same purposes and functions. The description of those parts and their operation are as described above, and this description is consequently directed to the additional components and functions of this particularly preferred embodiment of the present invention.

Spray header 63 is shown in operation in system 100 as is demister 65. System 100 has additionally a continuous filtration feature which is shown at 120 and comprises a continuous filtration apparatus 122 including an aerator 122a on the intake side, a solution separator plate assembly 122b and solids separator elements 122c. Spray water withdrawal line 123 serves compartment 31c of settling tank 25 and communicates with filtration apparatus 122 through valves 127 and 128 on either side of pump 129. On the output side of filtration apparatus 122 means are provided for delivering filtered spray water into chamber 35 of settling vessel 25 at a point above the top of cascade dam 33. The means consist of vessel 130, a line 132 connecting filtration element 122 and vessel 130, a pump 133 in line 132, and a line 136 connecting vessel 130 to settling tank 25 at a level above line 39 and the top of cascade dam 33.

Settling tank 25, as shown in detail in FIGS. 3-6, is an elongated, closed box of square cross section having a bottom wall 150 (FIGS. 4 and 5) sloping upwardly from intake to discharge end. Overflow port 156 is provided in the chamber 35 portion of the tank sidewall. Additionally, a pH sensor port 158 is provided in that sidewall at a level below the normal water level in chamber 35, and a fresh water make up 160 is located adjacent to—and on the same level as—sensor port 158. Tank fill line port 162 is provided in the upper part of the tank sidewall of chamber 31.

I claim:

1. In a waste gas treatment system including gas separating apparatus comprising water spray header means in a vessel having gas intake and exhaust ports and a flue communicating with the vessel intake port and a waste gas source, a centrifugal gas cleaning apparatus communicating with the gas exhaust port of the gas separating apparatus vessel, the combination of a settling tank connected to the vessel to receive accumulating spray water, a spray water recirculating line connecting the settling tank to the spray header means and pump means for delivering water from the settling tank to the spray header means, the settling tank having cascade dams dividing the tank into a series of chambers of diminishing depth in the direction of water flow, a fresh water line connected directly to the gas cleaning apparatus, and a drain line connecting the cleaning apparatus to the settling tank for delivering wash water into the settling tank.

2. The system of claim 1 including a fresh water fill source connected to the final chamber in the chamber series to maintain a predetermined water level in that chamber.

3. The system of claim 1 in which the settling tank has a drain point in the lower portion of each of the chambers, and in which the system includes filtration means connected to the settling tank through the drain points to receive drain sludge and extract spray water from the sludge and connected to the recirculation line for delivering water from the filtration means to the spray header means.

4. The method of treating a hot waste gas stream which comprises the steps of traveling the stream through a heat exchange station, flowing heat exchange fluid in indirect heat exchange contact with the stream in the heat exchange station, recovering heat from the flowing heat exchange fluid, traveling the resulting cooling waste gas stream through a liquid spray, collecting and filtering the spray liquid and recirculating it in a repetition of the spray cycle, traveling the resulting cooled and spray-cleaned waste gas stream through a demisting station, traveling the cooled and treated and demisted waste gas stream through a gas cleaning station, delivering fresh water continuously into contact with the gas stream flowing through the gas cleaning station, and finally discharging the resulting cleaned gas stream to the atmosphere.

5. The method of claim 4 including the step of chemically treating the recirculating spray liquid thereby maintaining a predetermined pH characteristic in the cooled and treated and demisted waste gas stream discharged to the atmosphere.

6. The method of claim 5 including the step of adding alkali to the recirculating spray liquid to maintain a predetermined pH in the waste gas stream discharge to the atmosphere.

7. The method of claim 6 including the step of stripping waste gas heat from the flowing heat exchange fluid for industrial heating purposes.

* * * * *